Patented June 23, 1953

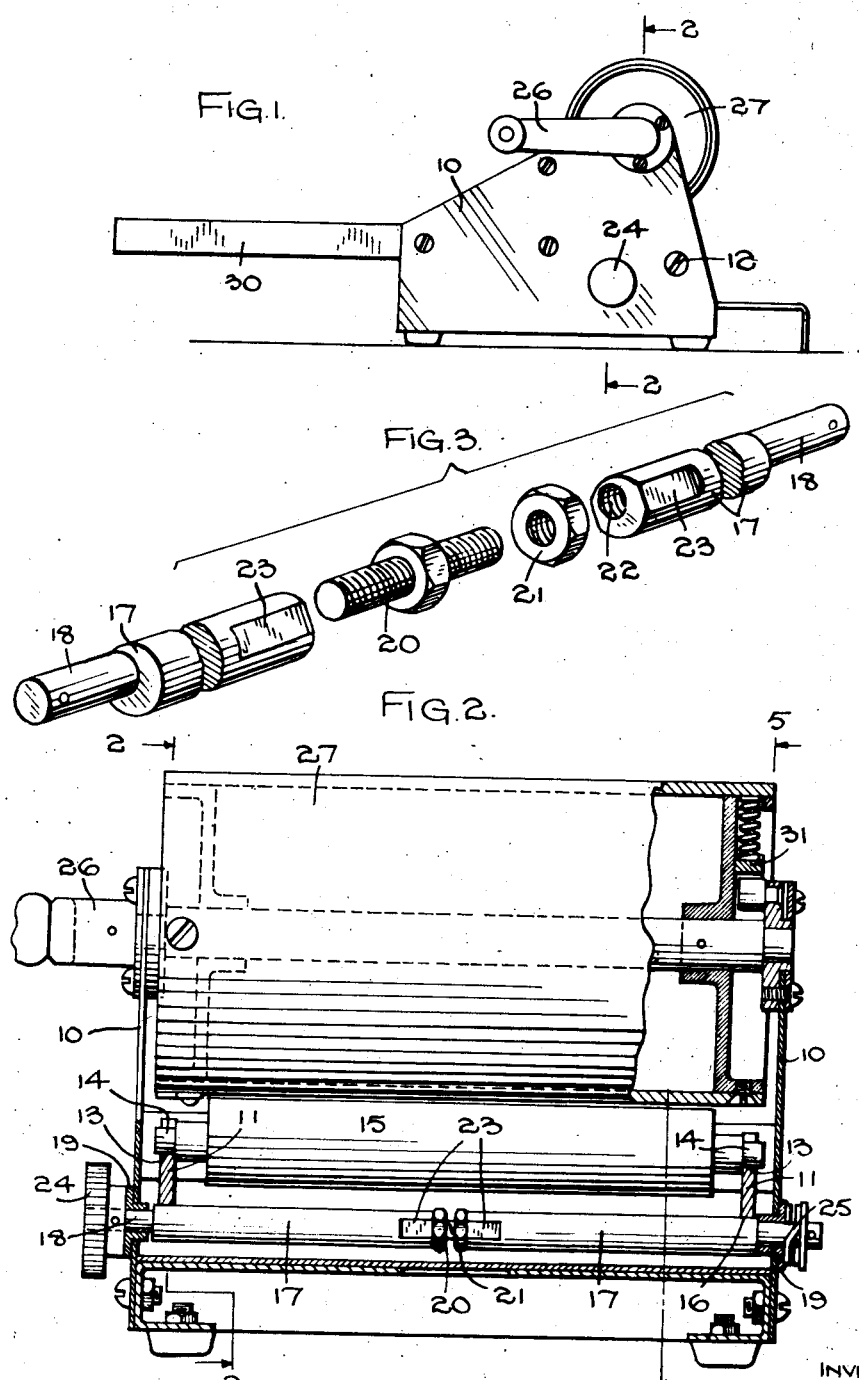

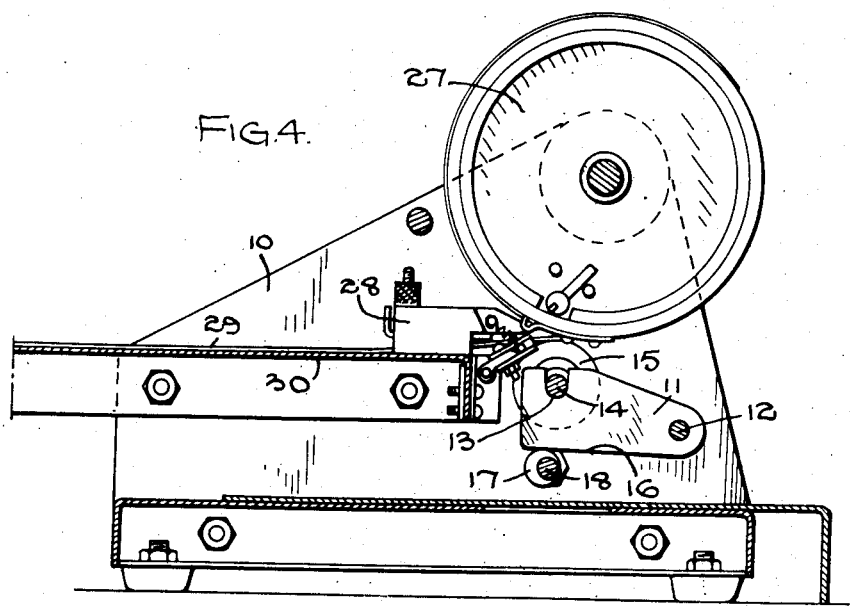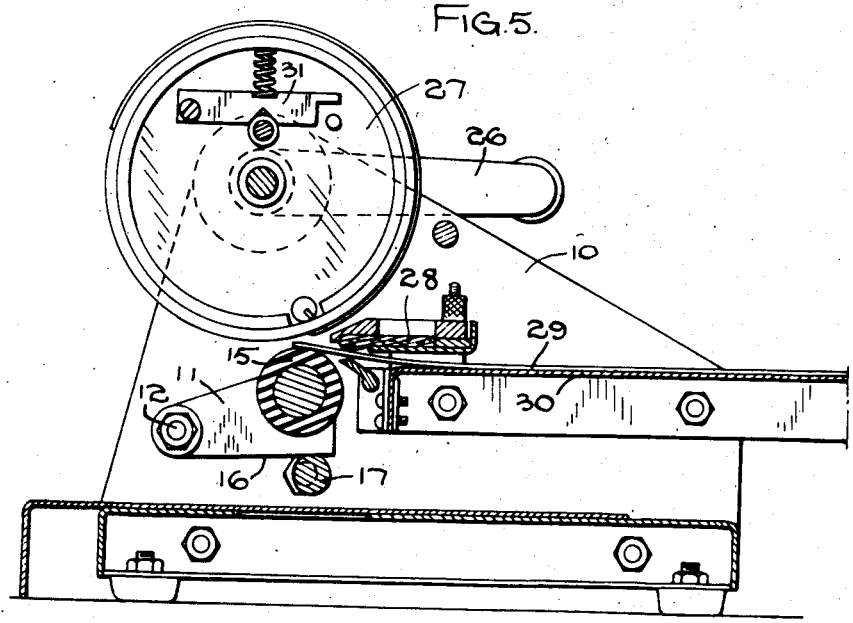

2,642,799

UNITED STATES PATENT OFFICE 2,642,799

MEANS FOR PRESSURE ROLLER SPINDLE SUPPORT AND ADJUSTING DUPLICATING MACHINES

Ronald Max Ford and George Thomas Butler, Sparkbrook, Birmingham, England; said Butler assignor to Frank R. Ford Limited, Sparkbrook, Birmingham, England, a British company Application April 27, 1950, Serial No. 158,382
In Great Britain May 7, 1949

3 Claims. (Cl. 101—132.5)

This invention relates to duplicating machines of the kind in which a copy sheet and a master sheet bearing in reversed script the matter to be reproduced are passed in pressure contact between a cylinder which carries the master sheet and a pressure roller, the copy sheet being moistened before being brought into contact with the master sheet.

The object of the present invention is to provide improved or simplified means for adjustably supporting the ends of the pressure roller.

According to the present invention the ends of the pressure roller spindle are supported in members movably mounted on the side members of the frame, and these movable members are supported upon cams or eccentrics on a shaft supported in the frame and parallel to the axis of the cylinder and the pressure roller, so that the pressure exerted by the pressure roller on the cylinder can be adjusted by turning the shaft.

Further, the pressure at each end of the pressure roller spindle is adjustable. This is done by making the cams or eccentric adjustable around the axis of the shaft upon which they are mounted. These cams or eccentrics may be angularly adjustable around the axis of the said shaft.

The shaft may be made in two parts each having an end portion for mounting in a bearing in a side member of the frame. These end portions are coaxial and each is provided with a main portion formed as an eccentric, one of the parts having a projecting pin at its end engaging in a socket in the adjacent end of the other part, the pin and socket being disposed coaxially with the end portions of the two shaft parts, and the two parts being angularly adjustable around the axis of their end portions and capable of being locked together in various adjusted positions.

The invention is illustrated in the accompanying drawings wherein:

Figure 1 is a side view of a machine according to the invention.

Figure 2 is a part section on the line 2—2 of Figure 1.

Figure 3 is an exploded view in perspective of the eccentric shaft.

Figure 4 is a section on the line 4—4 of Figure 2.

Figure 5 is a section on the line 5—5 of Figure 2.

In the construction shown in the accompanying drawing the frame of the machine has two side members 10 of the usual form, and pivoted to the inner surface of each side member 10 is a lever 11, these levers being pivoted coaxially on a horizontal axis 12 disposed at one end of each lever. The upper edge of each lever is provided with a recess 13 in which is supported an end of the pressure roller spindle 14 carrying the pressure roller 15.

The levers 11 are capable of rocking in a vertical plane about their pivots, and their lower edges 16 are supported upon cams or eccentrics 17 on a shaft rotatably mounted in the side members 10 of the machine frame.

The cam or eccentric shaft as shown in Figure 3 made in two parts each having an end portion 18 rotatably supported in a bearing 19 in one of the side members 10 of the frame and each having the main portion 17 disposed under the levers and between the side members of the frame. These main portions 17 are eccentric in relation to the end portions 18, and the two main portions are connected together by providing a threaded spigot 20 upon which is a lock nut 21, which spigot engages in screwed sockets 22 in the members 17. The spigot 20 and socket 22 are coaxial with the end portions 18 of the shaft, and the arrangement is such that the lock nut can be loosened and one eccentric portion 17 can be turned in relation to the other and then the lock nut can be re-tightened. This operation brings the eccentrics 17 out of register and the adjustment may be made until absolute uniformity of pressure along its length can be obtained for the pressure roller 15. The two eccentric portions 17 may be provided with flats 23 or other means which can be engaged by a spanner or other tool.

One end portion 18 is provided with an operating member 24 for turning the eccentric shaft as a whole to raise or lower the pressure roller 15 and the other end portion is provided with a spring washer 25 which, in combination with the clearance between the portion 17 and bearing 19 at the other end allows for the slight variation in axial length when the portions 17 are adjusted with respect to one another.

The machine is provided with an operating handle 26, master cylinder 27 and moistening means 28 for moistening copy sheets 29 fed from a feed table 30. The cylinder 27 is also provided with check means 31 as described in our co-pending application Serial No. 158,381, now U. S. Patent No. 2,623,459.

What we claim then is:

1. In a duplicating machine of the kind in which a copy sheet and a master sheet bearing in reversed script the matter to be reproduced are passed in pressure contact between a cylinder which carries the master sheet and a pressure roller, the copy sheet being moistened before being brought into contact with the master sheet; means for supporting the spindle of the pressure roller in the frame of the machine comprising, a support member for each end of the pressure roller spindle, each support member being movably mounted in the machine frame for controlled movement towards and away from the master cylinder, a shaft supported in the frame with its axis parallel to the axis of the master cylinder, said shaft being formed in two parts connected together at their inner ends, a cam portion on each said part fixedly associated with the shaft part, means for rotatively adjusting said parts of the shaft, said support members being arranged to rest upon said cam portions, and means for turning said shaft as a whole whereby the two parts thereof are rotated simultaneously about the axis of the shaft.

2. In a duplicating machine of the kind in which a copy sheet and a master sheet bearing in reversed script the matter to be reproduced are passed in pressure contact between a cylinder which carries the master sheet and a pressure roller, the copy sheet being moistened before being brought into contact with the master sheet; means for supporting the spindle of the pressure roller between spaced side members of the machine frame comprising, a lever pivotally mounted upon each side member of the frame about an axis parallel to the axis of the master cylinder, a shaft supported in the frame with its axis parallel to the axis of the master cylinder, said shaft being formed in two parts, a portion of each part being formed eccentrically with respect to the axis of the shaft, a screwed spigot connecting the inner ends of said parts, means for turning said parts relatively to one another about the axis of the shaft, said levers being arranged to rest upon said eccentric portions and means for turning said shaft as a whole whereby the two parts thereof are rotated simultaneously about the axis of the shaft.

3. In a duplicating machine of the kind in which a copy sheet and a master sheet bearing in reversed script the matter to be reproduced are passed in pressure contact between a cylinder which carries the master sheet and a pressure roller, the copy sheet being moistened before being brought into contact with the master sheet; means for supporting the spindle of the pressure roller between spaced side members of the machine frame comprising, a lever pivotally mounted upon each side member of the frame about an axis parallel to the axis of the master cylinder, a shaft supported in the frame with its axis parallel to the axis of the master cylinder, said shaft being formed in two halves, a portion of each half being formed of circular cross-section and eccentrically with respect to the axis of the shaft, a screwed spigot connecting said halves and the eccentric portion of each half having a flat surface thereon at the end adjacent said spigot, said levers being arranged to rest upon said eccentric portions, an operating member at one end of said shaft and a spring member acting upon the other end thereof, said operating member being adapted for turning said shaft as a whole whereby the two parts thereof are rotated simultaneously about the axis of the shaft.

RONALD MAX FORD.
GEORGE THOMAS BUTLER.

References Cited in the file of this patent

UNITED STATES PATENTS

| Number | Name | Date |
|---|---|---|
| 1,647,948 | Winkler | Nov. 1, 1927 |
| 1,954,550 | Weide | Apr. 10, 1934 |
| 2,026,434 | Quick et al. | Dec. 31, 1935 |
| 2,164,707 | Ford | July 4, 1939 |
| 2,502,278 | Robinson | Mar. 28, 1950 |
| 2,536,606 | Jagger | Jan. 2, 1951 |